United States Patent Office 2,823,190
Patented Feb. 11, 1958

2,823,190

HAMMER METAL FINISH AND RESINOUS FILM-FORMING MATERIAL THEREFOR

Andrew Marcis, Cleveland, and Paul D. Haas, Lakewood, Ohio, assignors to The Glidden Company, Cleveland, Ohio, a corporation of Ohio No Drawing. Application July 12, 1954
Serial No. 442,884

12 Claims. (Cl. 260—22)

This invention relates to a novel film-forming material especially adapted for use in hammer metal finishes, and to one-coat hammer metal finishes containing said novel material.

Various one-coat hammer metal finishes have become available in recent years (see U. S. Pat. 2,574,659 and the copending application of Millar, Ser. No. 255,729, filed November 9, 1951), but heretofore it has been difficult to control production batches of the film-forming material so as to yield finishes giving a uniform hammered metal pattern. Many factors enter into the control of the finished pattern such as spraying technique, solvent release, baking conditions where baking is used, and others, but the character of the film-forming material of the finish is one of the fundamental elements of control. The film-forming material in many instances, such as the styrenated alkyd film-formers, must be bodied to a point close to gelation of the batch, and hence needs to be carefully treated near the end of the bodying process so that the necessary molecular weight of the film-former is secured without actually gelling the batch. The leeway present at this stage of the processing is small, so that the processing is usually stopped as soon as the operator feels that the desired extent of bodying has been reached. He is reluctant to carry the bodying further from fear of losing the whole batch by gelling it. Such procedure, even when implemented with suitable control instruments, induces variations in the character of the material from batch to batch.

We have now found that by chemically combining alkyd resin(s), vinyl toluene and divinylbenzene, the bodying of compositions analogous to the styrenated alkyds of the prior art can be readily advanced to a desired and predetermined stage of viscosity and molecular weight without danger of gelling the batch, and we have found that when the desired body has been so reached, it is thereafter extremely stable. This latter benefit permits the prepared material and/or finishes containing it to be stored for long periods of time with assurance that the body will stay at the desired level until the material is wanted for use.

Accordingly, it is one object of this invention to provide a novel bodied film-forming material comprising vinyl toluene, divinylbenzene and alkyd resin(s) in a chemically combined state.

It is another object to provide a novel film-forming material particularly adapted for use in preparing hammer metal finishes exhibiting uniform pattern development from batch to batch.

Still another object is to provide an improved coating composition particularly adapted for use as a hammer finish for metals.

A further object is to provide a novel process for preparing film-forming materials of the type described in the preceding object.

These and other objects will be understood from the following description of the invention.

As noted above, styrenated alkyds which have heretofore been used in hammer vehicles have been difficult to process with the uniformity which is desirable in industrial finishes. While it has been generally thought that vinyl toluene, styrene and various substituted styrenes could be used interchangeably in the preparation of so-called styrenated alkyds so far as technical aspects were concerned, the art has not heretofore, to the best of our knowledge, known or recognized the technical benefits which attend the replacement of styrene with vinyl toluene. So far as we are aware, we are the first to have discovered that the use of vinyl toluene materially improves the solvent properties of the resulting alkyds in permitting the latter to be dissolved in aliphatic solvents. This discovery, especially as related to hammer vehicles, affords a greatly expanded scope of solvents and solvent speeds that can be used. Since hammer vehicles generally involve the factor of proper solvent release from the wet film in order to give control over the hammer pattern, the now widened field of solvents encompassing both the aliphatic and aromatic classes gives greater flexibility in the formulation of hammer vehicles than heretofore and hence affords improved control over pattern development and general application considerations.

When the above benefits flowing from the use of vinyl toluene are combined with the benefits flowing from our use of small amounts of divinylbenzene in the preparation of hammer vehicles, many if not most of the inadequate control problems of the prior art can be overcome without loss of drying speed, durability, and other desired properties. The vinyl toluene and divinylbenzene are introduced gradually into a kettle along with the ingredients of the desired alkyd, and are cooked into the composition as it is being synthesized to a finished product of low acid number (e. g., below about 50). Thus the materials become combined with the alkyd to form a homogeneous film-forming copolymer. During this formative period the divinylbenzene, being di-functional, affords cross-linking and a rapid development of the needed molecular weight. Consequently, by carefully controlling the amount of divinylbenzene, and by reacting it fully before further aliquot portions of the total are added, the finished mass can be controllably brought to the desired body without fear of gelation occurring. The cooked mass is then in a stable, combined state and the toluene radicals of the vinyl toluene and the cross-linking resulting from the divinyl benzene have so altered the solubility characteristics of the mass that the whole can be reduced with aliphatic solvents, if desired. While the aliphatics are cheaper generally than aromatics and their use is indicated in the interest of cost reduction, still it is generally beneficial to use mixtures of aliphatics and aromatics so as to secure the proper balance of solids content, viscosity, solvent release, etc., all of which assist materially in providing a finished vehicle giving hammer pattern which can be duplicated from batch to batch and which at the same time is well adapted for commercial production at lowered production costs.

It will be appreciated from the foregoing remarks that we desire in general to eliminate styrene in favor of vinyl toluene. Nevertheless, small amounts of styrene can be tolerated since small amounts will not materially impair the improved solvent properties attending the presence of cross-linking and chemically-combined toluene radicals in the resin. Hence it is possible to use the presently-available impure mixtures of divinylbenzene which, in addition to the latter compound, include styrene and various styrene derivatives. Even greater amounts of styrene than those introduced by use of such impure mixtures can be introduced into our resins in place of vinyl toluene, but such substitution should not be made unless one is willing to retrogress from the benefits of our invention toward the prior art.

The alkyd resin component of our resinous film-forming materials can be prepared from any of the raw materials of prior art alkyds as long as ethylenic unsaturation is present; e. g., in one or more dicarboxylic acid radicals, in one or more fatty acid radicals or both. Thus polyhydric alcohols such as glycerol, pentaerythritol, lower alkylene glycols, polyalkylene glycols, etc. can be used. When glycerol is to be used as one of such polyhydric alcohols, it can be derived in part or in full from triglyceride oils introduced into the formulation. Modification of the alkyd can also be secured through the use of monohydric alcohols in minor amounts along with the polyhydric alcohols, as is well known. Polycarboxylic acids which can be used are conventional ones, such as phthalic, isophthalic, terephthalic, mono-, di-, tri-, or tetra-chloro or alkyl substituted phthalic acid, each alkyl substituent being primary, secondary or tertiary and having one to five carbon atoms. Ordinarily it is most desirable to use phthalic acid as the aromatic dicarboxylic acid because it is the most readily available and the least expensive of the acids that are presently available in a pure form. When some ethylenic unsaturation is to be introduced through polycarboxylic acid, we prefer to use maleic acid and/or maleic anhydride in combination with phthalic acid or anhydride. Ethylenic unsaturation can also be introduced by preparing oil-modified or oil-acid-modified alkyds in which the modifying acids are unsaturated fatty acids of drying and/or semi-drying oils accompanied or not with the saturated acids of such oils. Non-drying oil acids can be used in combination with the above to modify the relative proportions between saturated and unsaturated oil-acids in the finished alkyd. Such modifying oils and/or oil acids comprise fatty acid radicals of 6–24 carbons. Synthetic acids corresponding thereto can be used in place of or along with the indigenous acids of natural oils. The "oil length" or fatty acid content equivalent thereto can vary widely; i. e., from short oil lengths to long oil lengths. However, we prefer to have the combined fatty acids correspond to between about 25% and 45% of oil in the finished product. As indicated above, the kind of oil (e. g., linseed, soya, castor, tung, fish, etc.) or the kinds of oils incorporated as mixtures into alkyd resins are of minor significance.

The amount of vinyl toluene incorporated into the alkyd resin(s) can vary as widely as the styrene in the styrenated alkyds of the prior art (e. g. U. S. Pat. Nos. 2,607,755, 2,392,710) but we can use amounts corresponding on a weight basis to from 10%–60% of the alkyd resin(s) and usually prefer 30–55%. Any of the available isomeric forms of vinyl toluene can be used individually or in combination in these amounts.

As indicated previously, the divinylbenzene considered as a pure material can be employed in small amounts, usually in amounts under 2% by weight on the resin solids, but we prefer less than about 1%. Since divinylbenzene is presently available only as a mixture with other materials such as styrene, vinyl toluene, ethyl vinyl benzene, diethyl benzene, etc., due allowance should be made for such non-divinylbenzene constituents. Any of such mixtures can be used by suitably proportioning the amount of such mixture in accordance with the divinyl benzene content thereof. One proprietary product (Dow Chemical Company) contains 75–80% of a mixture most of which is ethylvinylbenzene and diethyl benzene, remainder divinylbenzene. Such product is stabilized with one part per thousand of m. and p. tertiary-butyl catechol, and contains saturates amounting to 30–35% of the total weight.

The heating and bodying together of the alkyd(s), the vinyl toluene and divinyl benzene can be carried out favorably and conveniently in the presence or absence of inert solvents such as toluene, xylene, ethyl benzene and the higher boiling VMP naphthas. Proprietary designations of commercial products illustrative of the latter naphthas are Super VMP No. 8182, Apco Thinner, Super Naphthalite (112–115) 247°–290° F. The amount of solvent so used should never be so great as to interfere with the maintenance of a single-phase solution of the entire mass being heated and bodied.

The following examples illustrate the principles of our invention:

*Example 1*

| | Lbs. |
|---|---|
| Linseed oil, alkali-refined | 98.15 |
| Fish oil, alkali-refined | 33.00 |
| Pentaerythritol | 26.30 |
| Powder litharge | .04 |
| Phthalic anhydride | 50.40 |
| Vinyl toluene (m- and p-methyl styrene) | 162.70 |
| Divinylbenzene (as 23% solution) (Dow Chemical Co.) | 5.55 |
| Ditertiary butyl peroxide | 1.66 |
| 2,5-ditertiarybutyl hydroquinone | .0037 |
| Xylol | 19.00 |
| High boiling VMP naphtha (247°–290° F.) | 344.50 |

The linseed and fish oils were charged into a kettle equipped for solvent processing and were heated to 200° F. The litharge was then added and heating was continued to 470° F. The pentaerythritol was added and the temperature was held at 470° F. for formation of monoglycerides. Then the batch was cooled to 300° F. at which temperature the phthalic anhydride and xylol were added along with one-sixth of each of the vinyl toluene, the divinylbenzene, and the ditertiarybutylperoxide. The batch was then refluxed at approximately 320° F. and held for 20 minutes. The remaining mixture of vinyl-toluene, divinylbenzene and ditertiarybutylperoxide was added in 5 equal portions at 20 minute intervals. After the last addition, the batch was held at reflux until a body of W–X (Gardner-Holdt) at 50% NVM in high boiling naphtha had been reached. Heating was then discontinued, the batch was cooled and the high boiling naphtha was added, as was the ditertiarybutylhydroquinone. The batch was finally filtered. The acid number of the product was 8.4, its weight per gallon was 7.34 lbs. and the water loss during processing (based on solids) was 1.43%.

The product, at its reduced NVM of 50%, was formulated as follows to prepare a hammer finish adapted for spray application and for curing by baking and/or air-drying:

| | | |
|---|---|---|
| Resin vehicle as prepared above | pints | 6 |
| Xylol | do | 1 |
| VMP naphtha | do | 1 |
| Cobalt naphthenate (1.6% Co) | fluid oz | 1 |
| Aluminum pigment (non-leafing) | oz | 4 |

The above coating was sprayed on metal panels in a single coat and the panels were baked at 250° F. for 30 minutes. The cured panels had an attractive hammer finish appearance, and the finish had excellent durability. Other baking treatments can be used in place of the above, e. g., 15 minutes at 300° F. or 5–6 minutes at 325–350° F.

The cobalt naphthenate in the above hammer finish represents one of many heavy metal driers which can be used effectively in our finishes to vary the drying rate. Extended discussion of the use of driers in compositions such as ours or the more conventional styrenated alkyds of the prior art seems unnecessary since those skilled in the art are already well versed in the principles thereof.

In summary, it will be apparent that the present invention is directed fundamentally to a novel resinous product prepared from the following kinds and proportions of materials in percentage by weight:

| | |
|---|---|
| Vinyl toluene | 10–60%, preferred 30–55%. |
| Divinylbenzene | Up to 2%, preferred .1–2%. |
| Oil and/or oil equivalent of oil acids | 25–45%. |
| Alkyd: Non-oil and/or non-oil-acid components | 13–65%. |

In addition to the foregoing resin solids, the finished hammer coating of the invention contains catalyst, stabilizers and driers in small amount, aluminum pigment and/or pearlescent fish scale pigment in amounts between about 1% and 20% by weight on the resin solids, and variable amounts of solvents, thinners, diluents, etc., adjusted to fit the coatings to the various conventional methods of application. It is the combination of the particular resin solids with aluminum pigment, however, which constitutes the advance in the art of hammer finishes, since as explained fully hereinabove, the improved resin can be produced reliably and conveniently in the stable state needed for hammer finishes, and in a stable state affording wider tolerance of organic solvents. These improved characteristics in our resin are particularly adapted for use in hammer finishes because of the peculiar characteristics long known to be needed in the vehicles of such finishes.

Having now described our invention, what we claim is:

1. As a novel composition of matter, a resinous film-forming material particularly adapted for use as the film-forming component of a hammer finish for metals, said resinous material being the homogeneous, single-phase reaction product resulting from heating together the following kinds and amounts of materials as the principal solids-engendering ingredients thereof: (A) vinyl toluene in amounts between about 10 and 60% by weight; (B) divinyl-benzene in amounts between about .1% and 2% by weight; and (C) as the remainder, oil-modified alkyd resin containing ethylenic unsaturation, said oil-modified alkyd resin being a reaction product (a) in which the combined oil acids thereof are monocarboxylic acids of 6 to 24 carbons and are present in amounts equivalent to from about 25% to about 45%, by weight on said resinous film-forming material, of triglyceride oil selected from the group consisting of drying oils, semi-drying oils, and mixtures thereof; and (b) in which the remaining components thereof amount to between about 13% and 65%, by weight on said resinous film-forming material.

2. A resinous film-forming material as claimed in claim 1 wherein the vinyl toluene amounts to between about 30% and 55%.

3. A resinous film-forming material as claimed in claim 2 wherein the divinylbenzene amounts to less than about 1% and is added in the form of a mixture comprising divinylbenzene in a minor amount, and comprising ethylvinylbenzene and diethyl benzene in a major amount.

4. A coating composition particularly adapted for use as a hammer finish for metal, said composition comprising essentially: (a) resinous film-forming material as claimed in claim 3 catalyzed to dry to a coherent film; (b) dispersed pigment in amounts between about 1% and 20% by weight on the resin solids of said resinous film-forming material, said pigment being selected from the class consisting of non-leafing aluminum pigment, pearlescent fish scale pigment, and mixtures thereof; and (c) compatible organic solvents for said resinous film-forming material in amounts sufficient to dissolve said film-forming material and to permit said coating composition to be applied as a liquid, dryable film.

5. A coating composition as claimed in claim 4 wherein said resinous film-forming material is catalyzed to dry to a coherent film when an applied film of said coating composition is baked.

6. A coating composition as claimed in claim 4 wherein said resinous film-forming material is catalyzed to dry to a coherent film when an applied film of said coating composition is air-dried.

7. A coating composition particularly adapted for use as a hammer finish for metal, said composition comprising essentially: (a) resinous film-forming material as claimed in claim 1 catalyzed to dry to a coherent film; (b) dispersed pigment in amounts between about 1% and 20% by weight on the resin solids of said resinous film-forming material, said pigment being selected from the class consisting of non-leafing aluminum pigment, pearlescent fish scale pigment, and mixtures thereof; and (c) compatible organic solvents for said resinous film-forming material in amounts sufficient to dissolve said resinous film-forming material and to permit said coating composition to be applied as a liquid, dryable film.

8. A coating composition as claimed in claim 7 wherein said resinous film-forming material is catalyzed to dry to a coherent film when an applied film of said coating composition is baked.

9. A coating composition as claimed in claim 7 wherein said resinous film-forming material is catalyzed to dry to a coherent film when an applied film of said coating composition is air-dried.

10. A coating composition particularly adapted for use as a hammer finish for metal, said composition comprising essentially: (a) resinous film-forming material as claimed in claim 2 catalyzed to dry to a coherent film; (b) dispersed pigment in amounts between about 1% and 20% by weight on the resin solids of said resinous film-forming material, said pigment being selected from the class consisting of non-leafing aluminum pigment, pearlescent fish scale pigment, and mixtures thereof; and (c) conpatible organic solvents for said resinous film-forming material in amounts sufficient to dissolve said resinous film-forming material and to permit said coating composition to be applied as a liquid, dryable film.

11. A coating composition as claimed in claim 10 wherein said resinous film-forming material is catalyzed to dry to a coherent film when an applied film of said coating composition is baked.

12. A coating composition as claimed in claim 10 wherein said resinous film-forming material is catalyzed to dry to a coherent film when an applied film of said coating composition is air-dried.

References Cited in the file of this patent

UNITED STATES PATENTS

| | | |
|---|---|---|
| 2,534,617 | Mohrman | Dec. 19, 1950 |
| 2,574,659 | Prislin | Nov. 13, 1951 |
| 2,602,829 | Fromm et al. | July 8, 1952 |
| 2,609,353 | Rubens et al. | Sept. 2, 1952 |